(12) United States Patent
Hayden

(10) Patent No.: US 9,282,016 B2
(45) Date of Patent: Mar. 8, 2016

(54) LOSS MEASUREMENT IN A LINK AGGREGATION GROUP

(71) Applicant: TELEFONAKTIEBOLAGET L M ERICSSON (PUBL), Stockholm (SE)

(72) Inventor: James Hayden, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 64 days.

(21) Appl. No.: 14/375,042

(22) PCT Filed: Feb. 12, 2013

(86) PCT No.: PCT/IB2013/051145
§ 371 (c)(1),
(2) Date: Jul. 28, 2014

(87) PCT Pub. No.: WO2013/121352
PCT Pub. Date: Aug. 22, 2013

(65) Prior Publication Data
US 2015/0071096 A1 Mar. 12, 2015

(30) Foreign Application Priority Data
Feb. 15, 2012 (CN) .......................... 2012 1 0055990

(51) Int. Cl.
*H04L 12/26* (2006.01)
*H04L 29/06* (2006.01)
*H04L 12/709* (2013.01)

(52) U.S. Cl.
CPC ........ *H04L 43/0841* (2013.01); *H04L 43/0835* (2013.01); *H04L 45/245* (2013.01); *H04L 69/14* (2013.01); *Y02B 60/33* (2013.01)

(58) Field of Classification Search
None
See application file for complete search history.

(56) References Cited

U.S. PATENT DOCUMENTS

| 5,600,632 | A | 2/1997 | Schulman | |
|---|---|---|---|---|
| 6,188,674 | B1 | 2/2001 | Chen et al. | |
| 7,457,868 | B1 | 11/2008 | Guo | |
| 8,073,968 | B1* | 12/2011 | Shah | H04L 45/00 709/232 |
| 8,116,212 | B2* | 2/2012 | Kitajima | H04L 1/0082 370/242 |
| 8,599,684 | B1* | 12/2013 | Goertz | H04L 43/10 370/229 |
| 8,817,817 | B2* | 8/2014 | Koenen | H04L 12/10 370/468 |
| 9,015,299 | B1* | 4/2015 | Shah | H04L 29/06 370/232 |
| 2008/0298236 | A1 | 12/2008 | Ervin et al. | |
| 2009/0073921 | A1* | 3/2009 | Ji | H04L 45/00 370/328 |
| 2009/0196189 | A1 | 8/2009 | Ostrup et al. | |
| 2009/0225653 | A1 | 9/2009 | Kitajima | |

FOREIGN PATENT DOCUMENTS

WO WO2012/069379 A1 5/2012

OTHER PUBLICATIONS

ITU-T Y.1731, Jul. 2011, pp. 5, 26-29, 64, and 75.*
ITU-T G.8001, Jul. 2011, pp. 4-5.*
ITU-T G.8021, Oct. 2010, p. 45.*
International Search Report for PCT/IB2013/051145.

* cited by examiner

*Primary Examiner* — Asad Nawaz
*Assistant Examiner* — Thomas R Cairns

(57) ABSTRACT

Accurate measurement of packet losses over a logical link comprising a plurality of physical links is achieved by aligning the individual packet counters for the plurality of links to a common time reference. By aligning the counters of individual links to a common time reference, the packet losses calculated for each link can be summed to determine an aggregate loss for the link aggregation group.

10 Claims, 4 Drawing Sheets

LOSS MEASUREMENT IN A LINK AGGREGATION GROUP

TECHNICAL FIELD

The present invention relates generally to measurement of packet losses in a packet data network and, more particularly, to measurement of packet losses transmitted over a logical link comprising a plurality of physical links.

BACKGROUND

Link aggregation is a technique for creating a single logical link from multiple physical links to carry a greater amount of data than a single link can carry. Link aggregation can also provide some failure protection because the traffic is distributed among different physical links in the group. If a link aggregation group (LAG) is composed of three links, for example, each with a capacity of 1 Gb/s, it is possible to transmit 3 Gb/s of data. Alternatively, the same LAG can be used to transport 2 Gb/s of data (for example), which would allow any of the individual links to fail without impairing throughput. In a distributed system, link aggregation can also protect against equipment failure in the case where each link is terminated on different network equipment. Because of these capabilities, and because of the relative simplicity of LAG, it is broadly used for connections between customer and provider networks.

It is desirable to perform loss measurements on logical links using link aggregation. ITU-T Recommendation Y.1731 *Requirements for OAM in Ethernet Networks* (hereinafter "Y.1731") describes a protocol for determining end-to-end traffic loss in a network. In general, packet loss is determined by exchanging information between different network entities about how many packets have been transmitted and received in a specified time period or periods. There is no definition of how Y.1731 should work when using link aggregation. While Y.1731 describes a method of determining the loss of packets on individual links, there is no explicit solution for combining this information to determine the total loss measurement for all links in an aggregation group.

In some system architectures, determining the aggregate loss for a LAG can be solved by placing the packet counters at a point in the system where the data across all links in the aggregation group has been combined. Such systems are usually low cost systems where loss measurement and monitoring of a service may be less important. However, in a distributed packet system, there is often no single point to combine and count all packets associated with a particular LAG. In this case, the only solution is to measure the loss on each individual link and combine this data to provide the total loss for the group. The problem with this approach is that unless the measurements are all taken at the same moment in time, the total loss will not be representative of the period in which it was measured with respect to different links in the LAG. Since the period of measurements is typically between 1 s and 100 ms, accurate alignment of the packet counters is challenging.

In distributed network architectures, the individual links in a LAG may be terminated in different network entities. Distributed network architectures, thus, present a problem similar to distributed systems because there is no point at which the combined packets can be counted. In distributed network architectures, this problem is even more intractable.

SUMMARY

The present invention relates to measurement of packet losses over a logical link comprising a plurality of physical links. Individual packet counters for each link are synchronized in real time to a common time reference. By aligning the counters of individual links to a common time reference, the packet losses calculated for each link can be summed to determine an aggregate loss for the link aggregation group.

Exemplary embodiments of the invention comprise a method of measuring packet loss on a link aggregation group comprising an aggregation of two or more physical links. The method may be implemented by a network device at one end of a communication link. In one exemplary embodiment, packets transmitted and received over two or more physical links are aggregated by the network device. A common loss measurement period is defined for all physical links in the link aggregation group and packet counters for the link aggregation group are synchronized in real time to a common time reference. Each counter is configured to count packets transmitted and received over one or more physical links in the link aggregation group in one or more loss measurement periods. Once packets are counted, loss measurement messages are transmitted over two or more physical links. Each loss measurement message includes a count of packets transmitted and a count over one or more physical links in said link aggregation group. A link measurement reply is received responsive to each loss measurement message. Each loss measurement reply includes a count of packets transmitted and a count of packets received over the same psychical links in the same loss measurement periods as the corresponding loss measurement message. The aggregate packet loss for the link aggregation group may then be calculated by summing the packet losses on the individual links in the link aggregation group.

Other embodiments of the invention comprise a network device configured to transit and receive packets over a link aggregation group. In one exemplary embodiment, the network device comprises two or more line card modules and a node controller. Each line card module is connected to one or more physical links in the link aggregations group and has a counter to count packets transmitted and received by said line card module over one or more physical links. The line card module is configured to synchronize its counter in real time to a common time reference for said link aggregation group, count packets transmitted and received by said line card module in one or more loss measurement periods, transmit a loss measurement message to a remote network device, and receive a loss measurement reply from said remote network device responsive to said loss measurement report. The loss measurement message includes a count of packets transmitted and a count of packets received by said line card module in one or more loss measurement periods. The loss measurement reply includes a count of packets transmitted and a count of packets received by remote network device over the same physical links in said one or more loss measurement periods as the corresponding loss measurement message. The node controller is configured to aggregate packets transmitted and received by the line card modules over the physical links in said link aggregation group; define the loss measurement periods for counting packets transmitted and received by the line card modules; and calculate an aggregate packet loss for the link aggregation group based on the packet counts in the loss measurement messages and loss measurement replies.

The loss measurement techniques as herein described enable accurate measurement of packet losses on a LAG.

DETAILED DESCRIPTION

Figure 1:
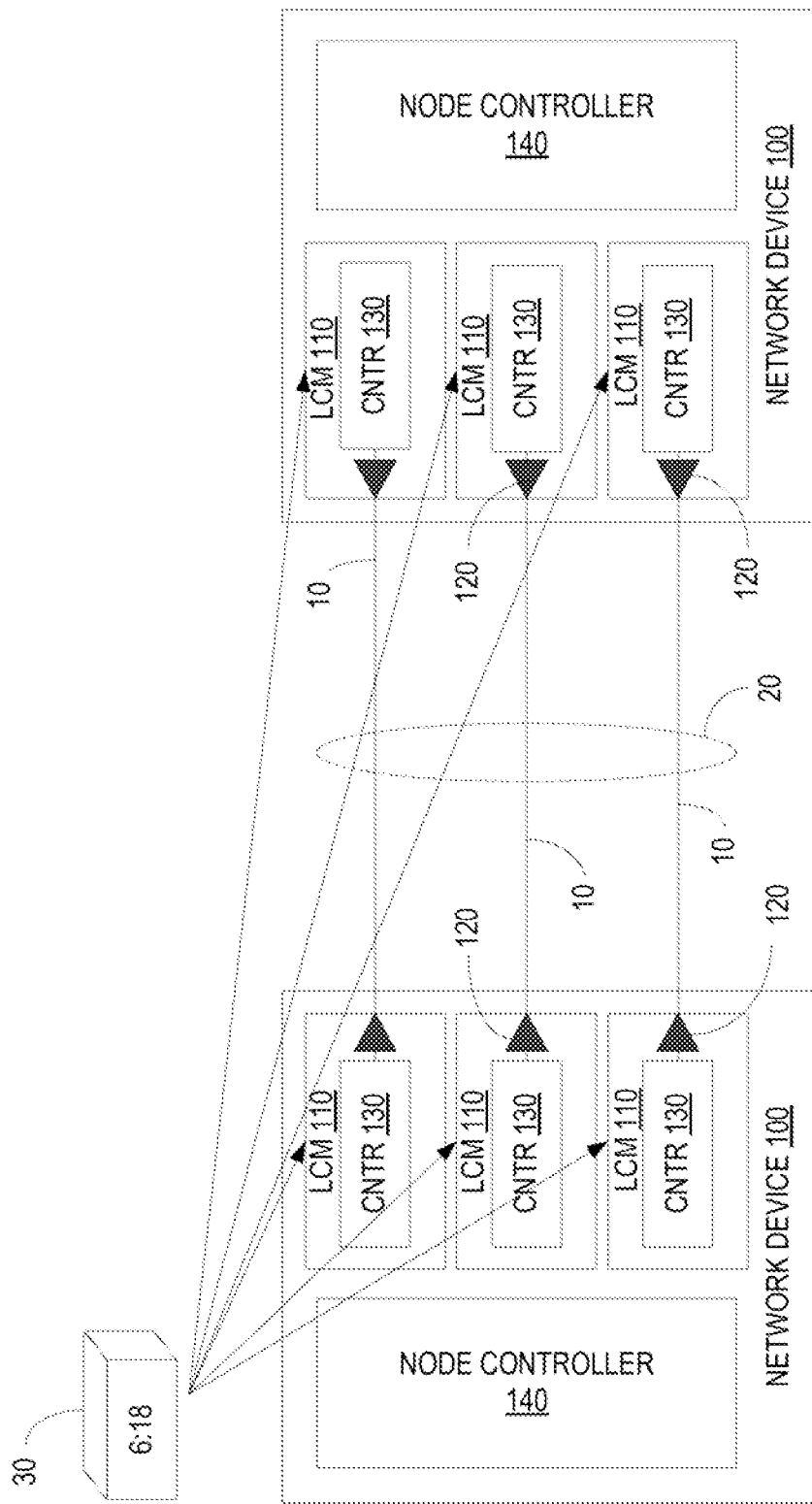
FIG. 1 illustrates two network devices communicating over a logical link comprising a plurality of physical links.

Referring now to the drawings, FIG. 1 illustrates two network devices 100 communicating over a single logical link comprising a plurality of physical links. The network devices 100 may communicate using any communication protocol that supports link aggregation. In the exemplary embodiments herein described, the network devices 100 communicate with one another using the Ethernet protocol. Those skilled in the art will appreciate that the present invention is also applicable to other communication standards supporting link adaptation.

The Ethernet protocol supports link aggregation. Link aggregation allows one or more physical links to be aggregated together to form a Link Aggregation Group (LAG) that is treated by the Media Access Client Control (MAC) client as a single logical link. Each physical link comprises a full duplex (FD), point-to-point (PTP) link operating at the same data rate. Link aggregation enables the logical link to carry a greater amount of data than a single link can carry. Link aggregation can also provide some failure protection because the data traffic is distributed among different physical links in the link aggregation group. If a failure occurs in one of the links, the network devices can still communicate over the remaining links with only a loss in data capacity.

Referring back to FIG. 1, the network devices 100 shown in FIG. 1 are connected by three physical links 10 forming a link aggregation group (LAG) 20. Each network device 100 comprises a plurality of line card modules (LCMs) 110 connected to respective physical links 10 in the LAG 20, and a node controller 140. Each line card module 110 comprises a link endpoint 120 and a counter 130. The link endpoint 120 may, for example, comprise a maintenance endpoint as defined in Y.1731. As hereinafter described, the counters 130 for each link are synchronized or aligned in real time to an external clock 30 providing a common time reference for all of the counters 130. Those skilled in the art will appreciate, however, that the absolute values of the counters do not need to be the same. The node controller 140 controls and monitors the operations of the line card modules 110. One of the functions performed by the node controller 140 is monitoring aggregate packet loss or frame loss over the LAG 20.

Figure 2:
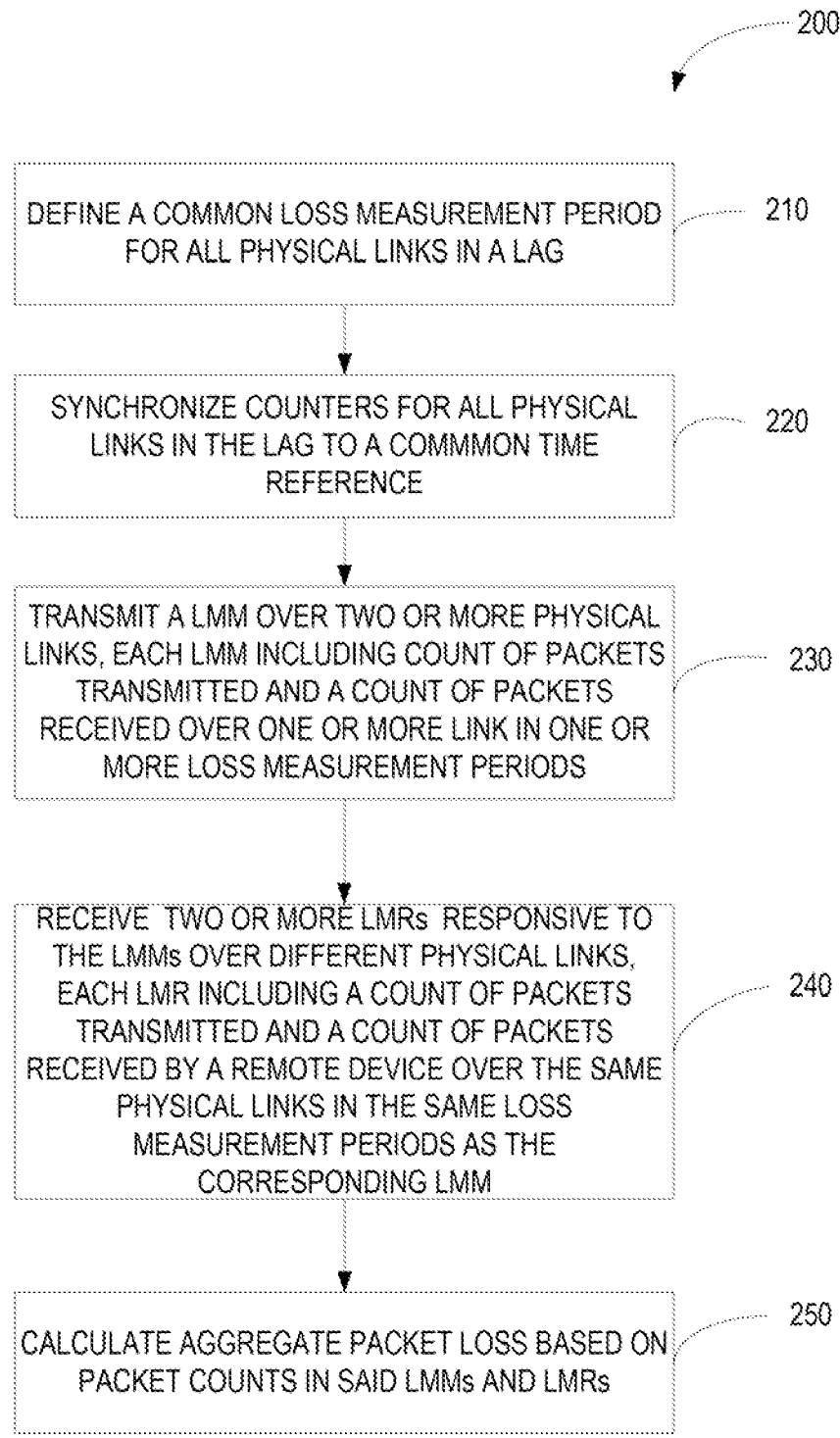
FIG. 2 is a flow chart illustrating an exemplary method of determining an aggregate packet loss for a link aggregation group.

FIG. 2 illustrates an exemplary method 200 of determining the aggregate packet loss for the LAG 20. First, the node controller 140 defines a common loss measurement period for all links in the LAG 20 (block 210). For example, the node controller 140 may specify the length, periodicity, and start time of the loss measurement period. The node controller 140 provides parameters for the loss measurement period via control signaling to the line card modules 110. The line card modules 110 synchronize their respective counters 130 to a common time reference (block 220). To align their counters 130 to the loss measurement period, the line card modules 110 need a common time reference with the desired degree of accuracy. The IEEE 1588 Precision Time Protocol describes one suitable mechanism for achieving time alignment of the counters 130, and is already used in the Y.1731 protocol for one-way delay measurement. However, other time-alignment mechanisms could also be used.

At periodic intervals as defined by the node controller 140, the line card modules 110 at each network device begin loss measurement reporting. The line card modules 110 at each end of the communication link will count packets transmitted and received in the defined loss measurement period. Typically, loss measurement is repeated periodically and the total packet loss is summarized over a longer period. The aggregate loss may, for example, be computed at an interval of 5 minutes to 15 minutes. At specified time intervals, the line card modules 110 at network device A send a loss measurement message (LMM) to the line card modules 110 at network device B (block 230). The reporting interval may be longer than the measurement interval and include one or more loss measurement periods. In one exemplary embodiment, the LMMs are transmitted synchronously by each line card module 110. The LMMs include a count of packets transmitted and a count of the packets received by network device A in the one or more loss measurement periods. Upon receipt of the LMMs by the line card modules 110 at network device B, the line card modules 110 at network device B send loss measurement replies (LMRs) to the line card modules 110 at network device A (block 240). The LMRs include a count of the packets transmitted and a count of the packets received by network device B over the same physical links 10 in the same loss measurement period or periods as the corresponding LMMs. The node controller 140 at either network device 100 may then compute an aggregate packet loss for the LAG based on the packet counts in the LMMs and LMRs (block 250).

In one exemplary embodiment, the line card modules 110 at each end of the communication link may separately compute the packet losses on a respective link and report the packet losses to the corresponding network controller 140. The network controller 140 may then compute the aggregate packet loss for the LAG 20 by summing the packet losses for the individual links. In other embodiments, the line card modules 110 may report the packet counts contained in the LMM and LMR to the network controller 140 and the network controller 140 can perform the computations of the packet losses.

Figure 3A:
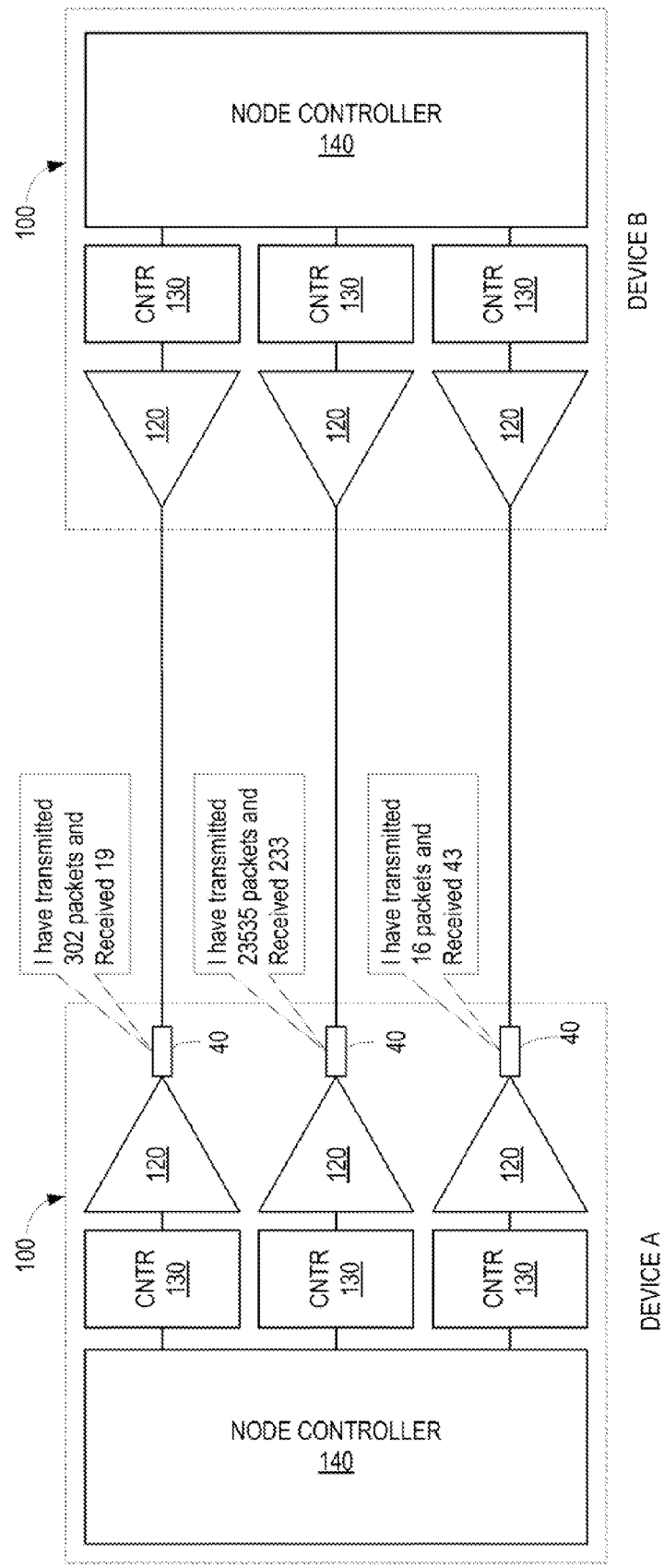
FIGS. 3A-3B schematically illustrate an exemplary computation of aggregate packet loss for a link aggregation group.
Figure 3B:
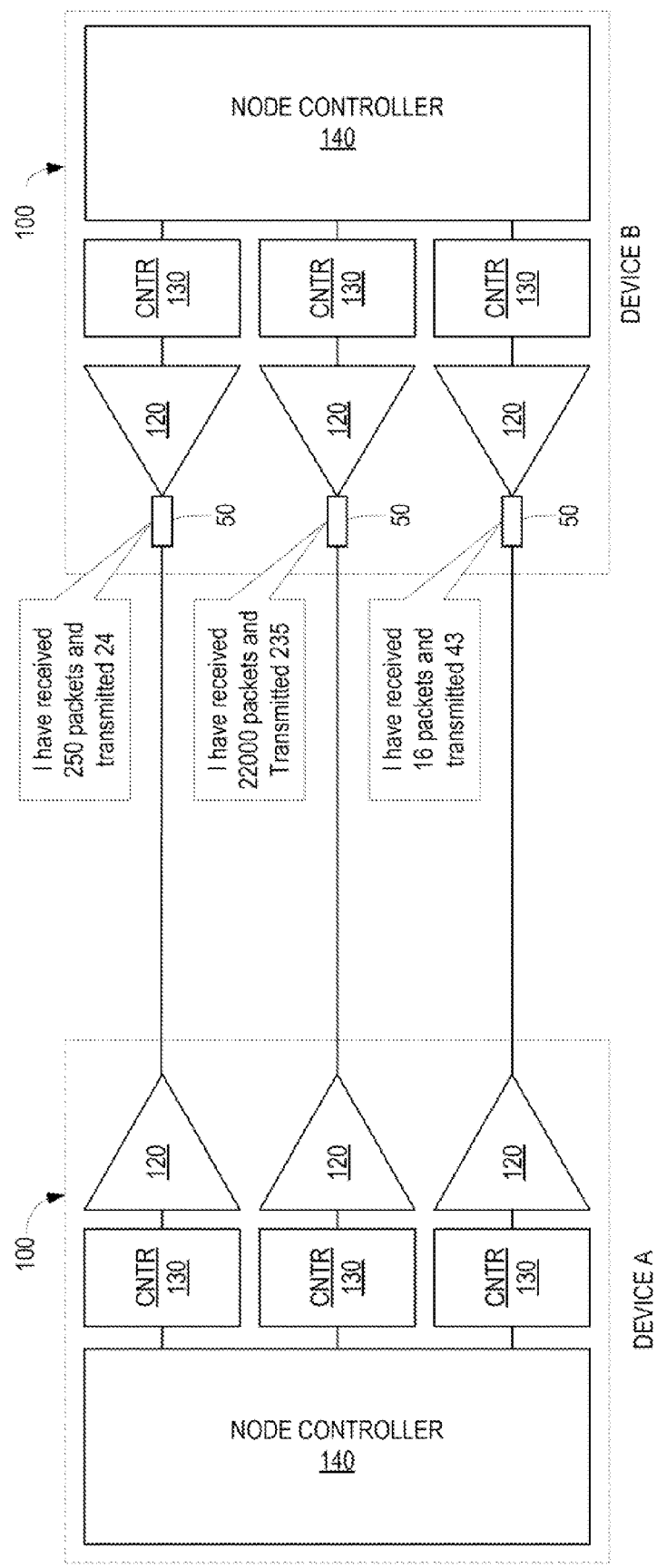

FIGS. 3A and 3B illustrate one example of loss measurement reporting. In this example, it is assumed that the line card modules 110 have their respective internal clocks aligned to a common time reference as previously described. At time t1, shown in FIG. 3A, the line card modules 110 at network device A synchronously transmit LMMs to their peers at network device B. In this example, the line card module 110 for link 1 reports 302 packets transmitted and 19 packets received. The line card module 110 for link 2 reports 23535 packets transmitted and 233 packets received. The line card module 110 for link 3 reports 16 packets transmitted and 43 packets received. At time t2, shown in FIG. 3B, each line card module 110 at network device B synchronously transmits a LMR to its peer at network device A. The LMRs are transmitted in response to the LMM received from network device A. In this example, the line card module 110 for link 1 reports 24 packets transmitted and 250 packets received. The line card module 110 for 66 link 2 reports 235 packets transmitted and 22000 packets received. The line card module 110 for link 3 reports 43 packets transmitted and 16 packets received. Table 1 below shows the packet loss for each link 10.

TABLE 1

Packet Loss by Link

| | Loss from A to B | Loss from B to A | Total link loss |
| --- | --- | --- | --- |
| Link 1 | 52 | 5 | 57 |
| Link 2 | 1535 | 2 | 1537 |
| Link 2 | 0 | 0 | 0 |

The packet losses shown in Table 1 may be computed separately by the line card modules 110 at each end of the communication link and reported to the node controller 140 at each network device 100. The node controller 140 can then compute an aggregate packet loss for each LAG 20 by summing the packet losses for the individual links. In the example given above, the aggregate packet loss for the LAG 20 is 1594 (57+1537+0).

In the examples shown above, each line card 110 includes a separate counter 130 to count the packets transmitted and received over a respective link 10 in the LAG 20. In some embodiments, a counter 130 may be located where it can count packets transmitted and received on a subgroup of the links 10. For example, a first counter 130 may count packets transmitted and received over two links 10 in a LAG 20, and a second counter 130 may count packets transmitted and received over a third link 10 in the LAG 20. If the counters are synchronized as herein described, the combined packets loss for the first two links 10 can be summed with the packet loss for the third link 10 to determine an aggregate loss for the LAG 20.

The loss measurement techniques as herein described enable accurate measurement of packet losses on a LAG 20. Other methods are either inaccurate, due to misalignment, or rely on an active standby approach whereby only a single member of the group is actively transmitting or receiving packets at any one time, essentially resolving the problem to a non LAG scenario.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of measuring packet loss on a link aggregation group comprising an aggregation of two or more physical links, said method comprising:
   defining one or more common loss measurement periods for all physical links in the link aggregation group;
   synchronizing two or more counters For the link aggregation group to a common time reference, each counter being configured to count packets transmitted and received over one or more physical links in the link aggregation group;
   transmitting at least two loss measurement messages over different physical links, each loss measurement message including a count of packets transmitted and a count of packets received over one or more physical links in said one or more loss measurement periods;
   receiving at least two loss measurement replies from the different physical links responsive to said loss measurement messages, each loss measurement reply including a count of packets transmitted and a count of packets received by a remote device over the same physical links in the same loss measurement period as a corresponding loss measurement message; and
   calculating an aggregate packet loss for the link aggregation group based on the packet counts in said loss measurement messages and said loss measurement replies;
   wherein calculating an aggregate packet loss for the link aggregation group comprises:
      transmitting the counts of packets transmitted and received by first and second link endpoints to a node controller, and
      calculating the aggregate packet loss for the link aggregation group by said node controller.

2. The method of claim 1 wherein at least one counter is configured to count packets transmitted and received over two or more physical links.

3. The method of claim 1 wherein each counter is configured to count packets transmitted and received over a single physical link.

4. The method of claim 1. wherein said loss measurement messages and said loss measurement replies are transmitted and received synchronously over respective different physical links.

5. The method of claim 1 wherein calculating an aggregate packet loss for the link aggregation group comprises:
   calculating packet loss for two or more subgroups of the physical links by two or more line card modules;
   transmitting the packet losses for said subgroups from two or more line card modules to a node controller, and
   calculating the aggregate packet loss for the link aggregation group by said node controller.

6. A network device connected to aremote network device by a link aggregation group comprising two or more physical links, said network device comprising:
   two or more line card modules, each line card module. connected one or more physical links in the link aggregation group and having a counter to count packets transmitted and received by said line card module over one or more physical links, said line card module being configured to:
      synchronize its counter to a common time reference for said link aggregation group;
      count packets transmitted and received by said line card module in one or more loss measurement periods;
      transmit a loss measurement message to the remote network device, said loss measurement message including a count of packets transmitted and a count of packets received by said line card module over one or more physical links in one or more loss measurement periods;
      receive, in response to said loss measurement message, a loss measurement reply from said remote network device, said loss measurement reply including a count of packets transmitted and a count of packets received over the same physical links in the same loss measurement periods as the corresponding loss measurement message; and
   a node controller connected to said line card modules, said node controller configured to:
      aggregate packets transmitted and received over said physical links in said link aggregation group by said line card modules;
      define said loss measurement periods for counting packets transmitted and received by said line card modules; and
      calculate an aggregate packet loss for the link aggregation group based on the packet counts in said loss measurement messages and said loss measurement replies;
   wherein:
      said line card modules are further configured to transmit the counts of packets in said loss measurement messages and said loss measurement replies to the node controller, and
      said node controller is configured to calculate the aggregate packet loss for the link aggregation group based on said packet counts.

7. The network device of claim 6 wherein at least one counter is configured to count packets transmitted and received over two or more physical links.

8. The network device of claim 6 wherein each counter is configured to count packets transmitted and received over a single physical link.

9. The network device of claim 6 wherein said line card modules are further configured to transmit said loss measurement messages synchronously over the respective physical links.

10. The network device of claim 6 wherein:
said line card modules are further configured to calculate packet loss for two or more subgroups of the physical links by two or more line card modules, and to transmit the packet losses for said subgroups to the node controller, and
said node controller is configured to calculate the aggregate packet loss for the link aggregation group by said node controller.

* * * * *